Patented Mar. 31, 1942

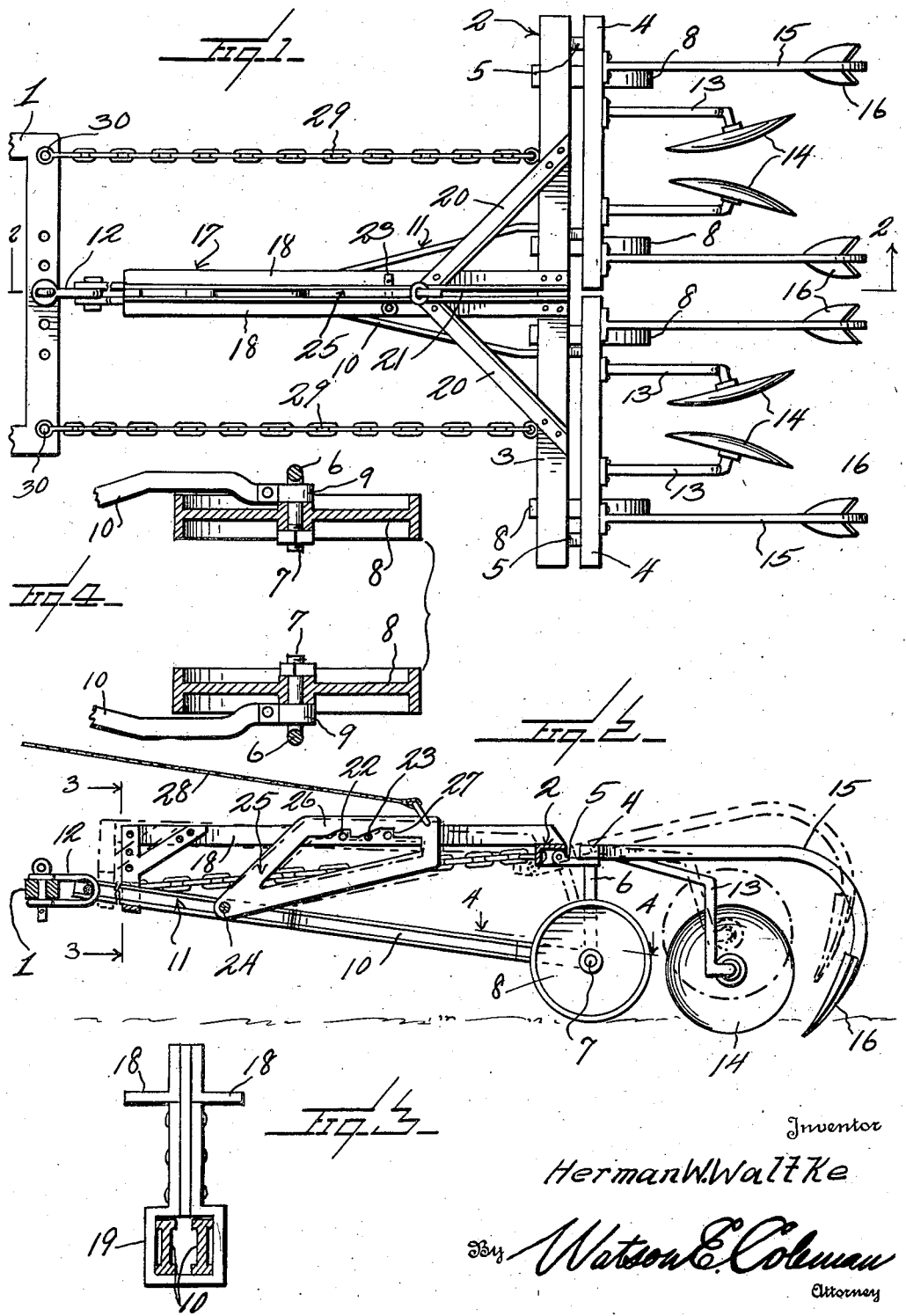

2,278,006

UNITED STATES PATENT OFFICE 2,278,006

AUTOMATIC GANG LIFT FOR CULTIVATORS

Herman W. Waltke, Pickrell, Nebr.

Application May 24, 1941, Serial No. 395,069

5 Claims. (Cl. 97—75)

This invention relates to the class of cultivators and pertains particularly to cultivators of the lister type.

The primary object of the present invention is to provide an improved lister type cultivator wherein means is provided to effect the automatic lifting of the listers and cultivator shovels from the ground when a turn is made at the end of a row or when for any other reason, the cultivator direction of movement is altered so that side strain or thrust upon the listers and shovels will not be produced, and the shovels and lister wheels or disks will be maintained in floating position until released for contact with the ground.

Another object of the invention is to provide an improved cultivator structure wherein the raising of the cultivator shovels and disks will be effected automatically when the cultivator is drawn into a curved path and wherein the ground engaging elements will be locked in such raised position until manually released for reengagement with the ground.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in top plan of the cultivator structure embodying the present invention, showing the same attached to a tractor draft bar.

Fig. 2 is a longitudinal section taken on the line 2—2 of Fig. 1.

Fig. 3 is a section on the line 3—3 of Fig. 2.

Fig. 4 is a sectional view on the line 4—4 of Fig. 2.

Referring now more particularly to the drawing, the numeral 1 designates a tractor draw bar to which the cultivator is shown attached. The cultivator comprises a frame 2 which consists of a beam 3 at the rear of which are disposed in spaced parallel relation therewith the alined shafts 4 which are pivotally coupled with the beam 3 by the hinge arms 5. By this means the shafts 4 are permitted rocking movement around the beam 3.

The shafts 4 carry the rigid downwardly extending posts 6, each of which at its lower end is right angularly turned to form an axle 7 upon which is rotatably mounted the ground engaging wheel 8. As shown in Fig. 1, a pair of these wheels 8 are disposed in relatively close proximity to and upon opposite sides of the longitudinal center of the machine and each of the axles 6 of these central wheels extends through a bearing 9 with which is integrally connected a forwardly extending bar 10. These bars converge a substantial distance forwardly of the machine to provide a draft tongue, which is indicated as a whole by the numeral 11 and to which a clevis 12 is connected and which is employed for coupling the draft tongue to the tractor draw bar 1 in the manner shown in Fig. 1.

The shafts also have connected therewith the rearwardly extending arms 13 which support the cultivator disks 14 and arms 15 which extend rearwardly and downwardly and carry the earthworking shovels 16. Thus it will be seen that the frame 2 can swing or rock as a unit around the alined axles 7 with which the draft tongue is pivotally connected, and when this occurs, the rearwardly extending arms 13 and 15 carrying the disks and shovels will be swung upwardly to raise the disks and shovels from contact with the ground.

Rigidly joined to the beam 3 at the transverse center thereof and extending forwardly on the longitudinal center of the machine is a slide beam indicated as a whole by the numeral 17 and preferably comprising a pair of spaced parallel angle bars 18. At their forward ends these angle bars have secured thereto the depending guide yoke 19 through which the forward end of the draft tongue 11 slidably extends. Suitable braces 20 are connected to opposite sides of the slide beam 17 and extend laterally and are joined at their outer ends to the transverse beam 3. It will thus be seen that by maintaining the angle bars 18 in spaced relation, there is provided a guide slot 21 which extends lengthwise of the machine.

Adjacent portions of the angle bars 18 are provided with alined transverse apertures 22 for the reception of a latch pin 23. Rearwardly of the yoke 19, the bars 10 which together form the draft tongue 11, have extended thereacross the connecting pivot pin 24. Upon this pivot pin is supported for vertical oscillation a latching element in the form of an elongated open frame 25 which has a top bar 26 which is provided in its under edge with notches 27. The upper part of this frame extends upwardly between the angle bars 18 or through the guide slot 21 and the notched bar 26 of the frame overlies the latch pin 23, as is shown in Fig. 2, so that the latch pin may have sliding movement forwardly with respect to the bar 26 and the notches 27, but the notches are so arranged that reverse movement of the latching pin cannot occur unless the frame 25 is swung upwardly on its pivot 24 for the release of the latching pin. In order to effect such release, a pull cable 28 is connected at one end with the rear end of the frame 25 and extends forwardly to the operator of the machine.

Upon either side of the slide beam 17 is a pull chain 29 which is connected at one end with the forward cross beam 3 of the frame axle while its other end is connected at 30 with the tractor draw bar 1. These chains 29 are of equal length and are both drawn taut when the cultivator is traveling forwardly in a straight path so that the beam 3 of the cultivator frame 2 is at right angles with the line of travel of the machine.

In the operation of the present machine, when the same is traveling forward in a straight path, the cultivator shovels and disks may be in lowered position, as shown in full lines in Fig. 2. If the operator of the machine now desires to make a turn and he steers the tractor in the desired direction, it will be seen that the tractor draw bar 1 will swing out of its parallel relation with the beam and shafts of the frame 2, thereby slackening one of the pull chains 29 and pulling hard upon the other. The chain which is thus pulled will tend to pull the whole frame 2 forwardly and will cause the frame to rock about the axles 7. The slide beam 17 will shift longitudinally forwardly, the yoke portion sliding on the forward end of the draft tongue 11 and the beam 3 instead of turning around the axis of the wheels, will merely swing down in an arcuate path, but the shafts 4 will rock, while at the same time swinging forwardly and downwardly and, consequently, the disk and shovels will be raised from the ground. The latch pin 23 will be carried forwardly with the beam 17, but the frame 25 will remain in its former position and, consequently, the pin 23 will move into a forward notch 27, and when the machine is then straightened out to again move forwardly in a straight path, it will be seen that the pin 23, being connected with a forward notch 27 of the latch frame 25, will prevent the slide beam 17 from shifting rearwardly and, consequently, the ground engaging elements will be held in raised position. Release of these elements may then be effected by the operator pulling upon the cable 27 so as to raise the latch frame or latching unit 25 to release the pin, but if the operator does not wish to lower the ground engaging elements, he may then carry them forwardly in a straight path in raised position.

The present machine was constructed as a lister corn cultivator, but it will be readily apparent that the invention does not have to be limited to use with this type of machine but may be adapted to any draft machine of this general character such as listers, plows, grain drills or any other implement which changes its angle to the draft machine in turning.

In addition to its function as a means for securing the gangs of earth-working implements in raised position, the latching mechanism may also be made to function as a means for controlling the depth of penetration of the shovels and disks into the ground, by changing the location of the latch pin 23 upon the slide beam 17.

From the foregoing, it will be readily apparent that there has been here disclosed a relatively simple and novel mechanism by means of which the automatic raising of earth-working implements may be effected when the machine changes its direction of travel so that the danger of breaking the earth-engaging parts of the machine in crossing ditches or uneven ground will be eliminated and also there will be eliminated the possibility of covering up young crops as a result of throwing too much earth in turning the machine.

What is claimed is:

1. A cultivator structure, comprising a draft tongue, supporting wheels operatively coupled with said tongue, a frame supported by said wheels to oscillate about the axis of rotation of the wheels, said frame comprising two elongated parallel members extending transversely of the machine, a beam connected at one end with one of said members and extending forwardly over said draft tongue, means forming a slidable connection between the other end of the beam and the draft tongue, earth-working elements carried by the other one of said members, and a pair of flexible pulling elements connected with the first-mentioned one of said members upon opposite sides of said beam for connection with a draft element with which said tongue is coupled, said pulling elements being of the same length whereby to be maintained taut when the draft element and cultivator are traveling in a straight path.

2. An automatic lift for earth-working elements of a cultivator comprising a draft tongue adapted for connection at one end with a draft machine, wheels operatively coupled with the other end of said tongue, an elongated frame structure extending transversely of the tongue above the wheels and comprising two elongated parallel members, pivotal means between said members, a pivotal coupling between the frame and the wheels whereby the frame may oscillate around the axis of rotation of the wheels, a beam connected at one end with the forward one of said members and extending forwardly above said tongue, means forming a sliding connection between the forward end of the beam and the tongue, means for attaching earth-working elements to the rear one of said members, and a pull chain secured to the forward one of said members upon each side of said beam and adapted to extend forwardly for attachment to the draft machine with the draft tongue.

3. An automatic lift for earth-working elements of a cultivator comprising a draft tongue adapted for connection at one end with a draft machine, wheels operatively coupled with the other end of said tongue, an elongated frame structure extending transversely of the tongue above the wheels and comprising two elongated parallel members, pivotal means between said members, a pivotal coupling between the frame and the wheels whereby the frame may oscillate around the axis of rotation of the wheels, a beam connected at one end with the forward one of said members and extending forwardly above said tongue, means forming a sliding connection between the forward end of the beam and the tongue, means for attaching earth-working elements to the rear one of said members, a pull chain secured to the forward one of said members upon each side of said beam and adapted to extend forwardly for attachment to the draft machine with the draft tongue, and latch means between said tongue and said beam for effecting the securing of the beam against return movement after it has been shifted forwardly with respect to the tongue.

4. An automatic lift for earth-working elements of a cultivator comprising a draft tongue adapted for connection at one end with a draft machine, wheels operatively coupled with the other end of said tongue, an elongated frame structure extending transversely of the tongue above the wheels and comprising two elongated parallel members, pivotal means between said members, a pivotal coupling between the frame and the wheels whereby the frame may oscillate around the axis of rotation of the wheels, a beam connected at one end with the forward one of said members and extending forwardly above said tongue, means forming a sliding connection between the forward end of the beam and the tongue, means for attaching earth-working elements to the rear one of said members, a pull chain secured to the forward one of said members upon each side of said beam and adapted to extend forwardly for attachment to the draft machine with the draft tongue, means for securing said beam against return movement after it has been fixed forwardly with respect to the tongue, comprising an elongated element pivotally attached at one end with said tongue and having a portion extending substantially parallel with the overlying beam, a latching pin carried by said beam and over which said parallel portion slidably moves, and said parallel portion having notches in its under edge for engagement with said latch pin.

5. An automatic earth-working element lifting means for a cultivator, comprising a draft tongue adapted to be connected at one end with a draft machine, ground-engaging wheels, a pivotal connection between the other end of the draft tongue and the wheels, a frame structure extending transversely of the tongue above the wheels and comprising two elongated parallel members, pivotal coupling means between said members facilitating oscillation of one relative to the other on an axis extending lengthwise thereof, supporting posts for said frame having pivotal connection with said wheels and having connection with the rear one of said members of the frame, the frame being oscillatable on the axis of rotation of the wheels, a draft beam connected at one end with the forward one of said members and extending over the draft tongue, means forming sliding connection between the other end of the beam and the tongue, a pull chain connected with said beam at each side of the tongue and adapted to extend forwardly for connection at its other end with the draft machine, said chains being of the same length, and a latching coupling between said tongue and said beam, comprising an elongated member pivotally attached at one end to the tongue and extending upwardly and rearwardly and having a portion paralleling the beam, said parallel portion having a plurality of downwardly directed notches, and a latching pin carried by said beam and having the notched portion of said latching element slidable thereacross.

HERMAN W. WALTKE.